US012768341B2

(12) United States Patent
Kentschke et al.

(10) Patent No.: US 12,768,341 B2
(45) Date of Patent: Oct. 20, 2026

(54) ELECTRO-HYDROSTATIC ACTUATION SYSTEM

(71) Applicant: Moog GmbH, Böblingen (DE)

(72) Inventors: Tino Kentschke, Weil der Stadt (DE); Dirk Becher, Nufringen (DE); Achim Helbig, Stuttgart (DE); Werner Händle, Marbach am Neckar (DE)

(73) Assignee: Moog GmbH, Böblingen (DE)

( * ) Notice: Subject to any disclaimer, the term of this patent is extended or adjusted under 35 U.S.C. 154(b) by 311 days.

(21) Appl. No.: 17/762,285

(22) PCT Filed: Oct. 15, 2020

(86) PCT No.: PCT/EP2020/079080
§ 371 (c)(1),
(2) Date: Mar. 21, 2022

(87) PCT Pub. No.: WO2021/074315
PCT Pub. Date: Apr. 22, 2021

(65) Prior Publication Data
US 2022/0333617 A1 Oct. 20, 2022

(30) Foreign Application Priority Data
Oct. 15, 2019 (DE) ..................... 10 2019 127 769.8

(51) Int. Cl.
*F04B 1/0443* (2020.01)
*F04B 27/04* (2006.01)
(Continued)

(52) U.S. Cl.
CPC ........ *F04B 1/0443* (2013.01); *F04B 27/0446* (2013.01); *F15B 15/18* (2013.01);
(Continued)

(58) Field of Classification Search
CPC .... F04B 1/0443; F04B 27/0446; F15B 15/18; F15B 21/005; F15B 2211/20515;
(Continued)

(56) References Cited

U.S. PATENT DOCUMENTS 5,493,860 A * 2/1996 Bjerke .................. F15B 21/005 60/458
5,775,103 A * 7/1998 Ingvast ................. F15B 21/044 60/488
(Continued)

FOREIGN PATENT DOCUMENTS

DE 10 2014 218887 B3 1/2016
FR 3029587 A1 * 6/2016 ......... F16H 61/4035
(Continued)

OTHER PUBLICATIONS

FR3029587A1_t machine translation thereof (Year: 2016).*
(Continued)

*Primary Examiner* — Matthew Wiblin
(74) *Attorney, Agent, or Firm* — Harter Secrest & Emery LLP; Michael Nicholas Vranjes

(57) ABSTRACT

An electro-hydrostatic actuation system and a method for driving a hydraulic actuator, e.g. a hydraulic cylinder, are described, wherein the system comprising a leakage branch, and wherein preferably an additional pump is arranged. The system further comprises a source for providing hydraulic liquid; a high-pressure circuit to direct the hydraulic liquid to a hydraulic actuator, such as e.g. a hydraulic cylinder; a low-pressure circuit having several branches; a main pump for hydraulic liquid arranged in the high-pressure circuit, comprising a housing having a high-pressure section and a low-pressure section, separated by gap sealings, wherein the high-pressure section comprises a first outlet and a second outlet to provide the hydraulic liquid flow in the high-pressure circuit; and wherein the low-pressure section com- (Continued)

Figure 1B:
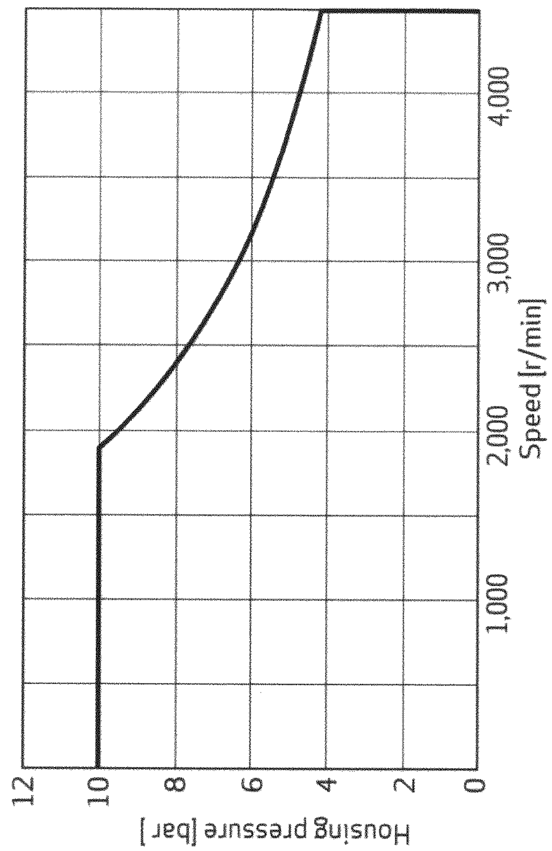

prises a leakage outlet; an electric motor driving the main pump.

20 Claims, 12 Drawing Sheets

(51) Int. Cl.
*F15B 15/18* (2006.01)
*F15B 21/00* (2006.01)

(52) U.S. Cl.
CPC ... *F15B 21/005* (2013.01); *F15B 2211/20515* (2013.01); *F15B 2211/20561* (2013.01); *F15B 2211/20576* (2013.01); *F15B 2211/615* (2013.01); *F15B 2211/62* (2013.01); *F15B 2211/7053* (2013.01)

(58) Field of Classification Search
CPC .. F15B 2211/20561; F15B 2211/20576; F15B 2211/615; F15B 2211/62; F15B 2211/7053
See application file for complete search history.

(56) References Cited

U.S. PATENT DOCUMENTS

2004/0103656 A1* 6/2004 Frazer .................... F15B 21/14 60/414
2004/0187491 A1* 9/2004 Whitaker ............... F04B 53/16 60/476
2009/0165457 A1 7/2009 Kakino et al.
2016/0084280 A1* 3/2016 Maier .................. F15B 11/022 60/431
2017/0328469 A1 11/2017 Le Dren et al.
2019/0072178 A1* 3/2019 Gepraegs ........... F16H 61/4104

FOREIGN PATENT DOCUMENTS

WO 0243980 A2 6/2002
WO 2012091942 A1 7/2012
WO 2019072715 A1 4/2019

OTHER PUBLICATIONS

European Patent Office (ISA/EP), International Search Report and Written Opinion in PCT/EP2020/079080, dated Jan. 20, 2021, 11 pages.
European Patent Office (ISA/EP), International Preliminary Report on Patentability in PCT/EP2020/079080, dated Feb. 1, 2022, 29 pages.

* cited by examiner

ELECTRO-HYDROSTATIC ACTUATION SYSTEM

The present invention relates to the field of hydraulics. More particularly this invention relates to an electro-hydrostatic motor-pump unit with extended operational range.

Electro-hydrostatic actuator systems are frequently encountered in the art and represent a major typology of drives for example for moulding machineries and presses, wherein a large force per unit area has to be delivered.

A variable-speed, electro-hydrostatic motor-pump unit derives from the direct coupling of a variable-speed electric motor with a hydrostatic pump, wherein the drive shafts of both machines also can be connected via an elastic compensating coupling. The electric motor provides a mechanical drive power in the form of speed and torque. This mechanical power is converted by the hydrostatic pump into a hydraulic output power implemented in the form of a volume flow and an operating pressure or a pressure difference on the hydraulics operating ports of the pump.

The hydrostatic pump of a variable-speed, electro-hydrostatic motor-pump unit is also capable of operating in motor mode. Thereby it converts hydraulic power into mechanical power, which drives the shaft of the electric motor.

The conversion of electrical power to hydraulic power or energy, and vice-versa, takes place between electric motor and hydrostatic pump. For the energy transport in the hydraulic part of the drive train, a liquid, usually hydraulic oil, is used.

A variable-speed, electro-hydrostatic motor-pump unit, and in particular when used to run a self-contained axis or a similar actuator, is usually integrated in a closed hydraulic circuit. The entire volume of hydraulic oil is enclosed in such circuit, and a low-pressure section of the circuit is pre-pressurized at a pressure greater than atmospheric pressure. In a self-contained axis system the entire system is hydraulically disconnected from the atmospheric pressure, while the oil volume of the system is typically smaller in comparison to a conventional hydraulic actuation system.

These constructional, structural, and mechanical features influence the functionality of such systems, so that their dynamics is heavily dependent on them. In fact, if a large force per unit area need to be applied, and/or large volumes are required, the tendency is to observe the onset of instability in the systems, and e.g. a collateral drop in pressure after a large enough value of speed as tipping point for the pressure at the rotary shaft seal. The pressure at a rotary shaft seal reflects the lower pressure in the low-pressure section of the main pump in an actuation system.

Large hydro-accumulators are used in the art to supply at least a partial compensatory aid in such events. Nevertheless, large accumulators are detrimental at least to the structural stability of such systems.

The existing challenges encountered in the prior art are at least partially addressed by an electro-hydrostatic actuation system as described in the present invention.

In particular, according to one embodiment of the present invention, the electro-hydrostatic actuation system for driving a hydraulic actuator, e.g. a hydraulic cylinder, comprises a leakage branch. An electro-hydrostatic actuation system typically includes a motor or electric engine powering a hydraulic machine. The hydraulic machine provides displacement of hydraulic liquid through a hydraulic circuit; the displacement of the hydraulic liquid in the circuit (wherein "circuit" may be used in the following, and throughout the entire application, as a synonym for hydraulic circuit) results in a movement of the actuator.

A hydraulic actuator in the meaning of the present invention is a device capable of undergoing displacement owing to a volume of hydraulic liquid being displaced by a hydraulic machine connected to it; typical examples of hydraulic actuators are hydraulic cylinders of many sorts, such as synchronous cylinders or differential cylinders, hydraulic rotary drives, self-contained axes etc. The displaced volume of hydraulic liquid causes a mechanical displacement of a movable component or part of the actuator.

The system further comprises: a source for providing hydraulic liquid; a high-pressure circuit to direct the hydraulic liquid to a hydraulic actuator, such as e.g. a hydraulic cylinder; a low-pressure circuit having several branches; a main pump for hydraulic liquid arranged in the high-pressure circuit, comprising a housing having a high-pressure section and a low-pressure section, separated by gap sealings, wherein the high-pressure section comprises a first outlet and a second outlet to provide the hydraulic liquid flow in the high-pressure circuit; and wherein the low-pressure section comprises a leakage outlet; an electric motor driving the main pump. According to this embodiment, the electro-hydrostatic actuation system further comprises a leakage branch, connecting the hydraulic leakage outlet of the low-pressure section of the housing of the main pump to the low-pressure circuit, wherein preferably an additional pump is arranged.

A hydraulic leakage, as intended by leakage in the meaning of the present invention, is typically a loss of hydraulic liquid, typically hydraulic oil, from a volume containing said liquid at a given pressure, such as, for example, the housing of a pump, and provided with sealing systems, such as a combination of sealing devices, gap sealings, shaft seals and other similar sealing means; a leakage is generally allowed to happen in a volume depending on the operation of the hydraulic system (speed, temperature, volume of hydraulic liquid, etc.) in order to ease the operation of the machinery itself and, for example, maintain the system at a specific given or wanted pressure during a cycle or a number of cycles.

Small aperture, orifices or grooves or any similar tracks may be provided in the structure of the housing of the pump to allow hydraulic liquid to flow from the higher pressure section to the lower pressure section of the housing to lubricate, clean and cool along a specific path.

A moderate amount of leakage such as the one described above, also considered as planned leakage, is therefore usually present in every working hydraulic and electro-hydraulic actuation system. Leakage due to wear or poor design of otherwise leakage-proof parts is instead generally considered detrimental to the correct functioning of a hydraulic system, since an unwanted or large loss of liquid is associated with an unwanted and accordingly large variation of the pressure in the system, leading to major disruptions in functionality and generally poor performance.

A gap sealing is typically devised as a means for sealing between static and dynamic components, and in particular is association with hydraulic systems, such as for example hydraulic pumps. Shape and width of the gap is carefully designed to maximize the efficiency of the hydraulic system in particular by maintaining an optimally low amount of fluid loss at the interface.

A leakage branch according to the present invention derives from the hydraulic connection of the hydraulic circuit with a leakage outlet, typically located at the interface between the main pump and the hydraulic circuit, as a connection of the housing with the low-pressure section.

According to the present invention, the leakage branch is provided with an additional pump, so that it operates additionally to the main pump.

The electro-hydrostatic actuation system is essentially a hydraulic circuit provided with several portions, including branches as smaller components of a portion or portions themselves. A hydraulic pump essentially causes the flow or movement of a hydraulic liquid or fluid, converting mechanical energy into hydraulic energy. In the following, we will be mostly concerned with hydraulic liquids, and set gases or plasmas aside.

The main pump according to the present invention determines the necessary flow of hydraulic liquid in order to generate the pressure in different portions or combination of branches of the circuit and in particular this determines a differentiation between two main portions of the actuation system, essentially a low-pressure circuit and a high-pressure circuit, intended in a relative sense with reference to the operational pressure of a pump in a hydraulic system. The main pump provides said differentiation by having internal separation of a low-pressure section and high-pressure section, wherein said sections at different pressure are separated by sealing systems, such as a combination of sealing devices, gap sealings, shaft seals and other similar sealing means.

The values associated with said low-pressure and high-pressure qualifiers depend on the quality and/or structural properties and/or the working dynamics of such sealing systems, gaps, shaft seals or rings. According to said structural properties of said sealing means, the pressure acting on them should not exceed a predefined value.

In the meaning of the present invention, a source for providing hydraulic liquid is a pre-pressurized or pre-stressed container, or hydraulic accumulator or even just accumulator, wherein hydraulic liquid, typically a hydraulic oil or viscous liquid, of a given density and viscosity is stored at a certain given pressure. A large accumulator is typically a solution for closed hydraulic circuit maintained at a given low pressure to increase the operational range of a motor, since the hydraulic liquid is re-circulated at every cycle. Nevertheless, a large accumulator is not an ideal or effective solution for compact systems.

The size, i.e. the volume, of the hydraulic accumulator largely depends on the dynamic/thermal use (adiabatic-isothermal) and the allowable pressure difference between minimum and maximum fill of the hydraulic accumulator and from the particular actuator working dynamics; in particular, for example, when using a differential cylinder as an actuator the size of the accumulator would be influenced from the size of the oscillating volume flow between the piston and the rod side.

As a consequence, a higher permissible pressure difference between minimum and maximum working pressure of the hydraulic accumulator allows for a reduced necessary storage volume of the accumulator. However, the maximum working pressure of the hydraulic accumulator, and thus the maximum pressure difference is limited by the maximum permissible pump's housing pressure, which in turn results from the load limits of the shaft seal or sealing system used. Therefore, as mentioned above, the volume of hydraulic accumulators, especially in closed systems such as self-contained axes according to the prior art, must be made correspondingly larger owing to this limitation.

In the meaning of the present invention the main pump comprises a housing, which includes a high-pressure section and a low-pressure section, separated by gap sealings; in the high-pressure section outlets are arranged to provide the hydraulic liquid flow in the high-pressure circuit, while a leakage outlet as mentioned above is arranged in the low-pressure section. By means of the additional pump arranged on the leakage branch connecting the leakage outlet to the low-pressure circuit, the pressure acting on the shaft sealing ring or on alternative sealing means in the main pump housing is deliberately lowered in relation to the pre-stressed low pressure of the main pump. The qualifiers low-pressure and high-pressure for the portion of the hydraulic circuit or a section of the main pump according to the present invention are intended as relative, so that if one section or circuit its operated or has a pressure that is lower than another section or another portion of the circuit or another circuit, then said section or circuit will be denominated low-pressure section or low-pressure circuit, and vice-versa.

According to another embodiment of the present invention, the electro-hydrostatic actuation system as described above further comprises a first valve and a second valve, separating the high-pressure circuit from the low-pressure circuit.

In the meaning of the present invention, a valve, or hydraulic valve, constitutes means to direct the flow of hydraulic liquid along a branch of the circuit wherein it is arranged. Their positioning designates the separation between the low-pressure circuit and high-pressure circuit and therefore regulates the flow of hydraulic liquid in a manner that adapts to the working pressure required in the system.

According to another embodiment of the present invention, the first valve and the second valve in the electro-hydrostatic actuation system are check valves or control valves.

In the meaning of the present invention check valves direct the flow of hydraulic liquid from one end to the other end, or vice-versa, in order to prevent the flow of the hydraulic liquid backwards; in the meaning of the present invention, said first and second valves may instead control valves such that, when arranged into the system as described, the valves control the flow of the hydraulic liquid by for example altering the aperture of the flow passage and the parameters related to the flow of hydraulic liquid, such as, for example the flow rate and subsequently pressure and temperature.

According to a further embodiment of the present invention, the electro-hydrostatic actuation system further comprises a flushing branch, connecting a flushing inlet of the low-pressure section of the housing of the main pump to the low-pressure circuit, and having a hydraulic connection with the leakage branch.

In the meaning of the present invention, a flushing inlet is arranged in the low-pressure section of the housing of the main pump and is in hydraulic connection with the leakage branch, wherein an additional pump is arranged, to bring the advantage of using the leakage flow through the low-pressure circuit and through the flushing branch, connected to the flushing inlet, to lower the lower pressure at the sealing means in the low-pressure section of the housing of the main pump.

Lowering the lower pressure of the main pump enables the electro-hydrostatic actuation system to operate at higher speeds than those that would normally be allowed by the size of the hydraulic accumulator, as mentioned above. This allows to retain the compactness of the system by reducing the size of the accumulator.

Moreover, the higher adjustable low pressure determines a better clamping of the actuator by increasing its hydraulic elastic modulus, which in turn improves the controllability of the actuator because of a higher natural frequency.

According to a further embodiment of the present invention, an additional valve is arranged in the flushing branch of the electro-hydrostatic actuation system.

By introducing a valve in the flushing branch, several parameters of the hydraulic flow can be controlled at will, according to the type of valve that is installed, in addition to one of the valves that might be present according to other embodiments.

According to a further embodiment of the present invention, the electro-hydrostatic actuation system further comprises a flushing branch connecting the flushing inlet of the low-pressure section of the housing of the main pump to the high-pressure circuit, wherein an additional valve is arranged, having a hydraulic connection with the leakage branch. In this embodiment, the hydraulic connection between the high-pressure circuit and the leakage branch comprises additional pressure-controlled valves, preferably pressure-controlled unidirectional check valves.

In the meaning of the present invention, a further embodiment is provided, wherein the flushing branch is arranged in the high-pressure circuit, still connected to the low-pressure section of the housing of the main pump. This embodiment allows for a larger flexibility in the design of the system to better suit structural constraints of its architecture. By the same above-mentioned principles, the flushing branch provides the benefit of lowering the lower pressure at the sealing means in the low-pressure section of the housing of the main pump, to achieve higher operational speed of the actuation system.

According to a further embodiment of the present invention, the additional valve arranged in the flushing branch of an electro-hydrostatic actuation system is a unidirectional check valve.

By adding a unidirectional check valve, according to this further embodiment of the present invention, the hydraulic flow can be directed in a preferred direction, to allow the system to operate under controlled conditions.

According to a further embodiment of the present invention, the additional valve arranged in the flushing branch of the electro-hydrostatic actuation system is a prestressed (or non-return) valve.

In the meaning of the present invention, the valve arranged in the flushing branch according to this embodiment is prestressed to open at a certain pressure load given by a pump pressure upper limit and possibly for a given range of pressures. This allows to control the operation regime of the circuit and increases operational efficiency in particular by separating the pressure inside the main pump housing of the actuation system from the low pressure in the system.

According to a further embodiment of the present invention, the additional pump of the electro-hydrostatic actuation system has a delivery volume larger than the leakage volume of the main pump occurring in the low-pressure section of the housing of the main pump.

In the meaning of the present invention, the delivery volume of the additional pump being larger than the leakage volume increases the efficiency of the actuation system and allows the pressure reduction in the pump housing compared to the low pressure. The volume flow delivered via the additional pump, and exceeding the external leakage of the system, is controlled by the prestressed valve above.

According to a further embodiment of the present invention, a further valve is arranged in hydraulic connection with the leakage branch, before the additional pump, and has a hydraulic connection with the low-pressure circuit of the electro-hydrostatic actuation system.

The further valve allows for further control of the pressure peaks and may provide limitation of the housing pressure peaks or provide protection against a failure of the additional pump arranged on the leakage branch by limiting the internal pressure of the main pump.

According to a further embodiment of the present invention, the electro-hydrostatic actuation system further comprises a filter unit having a hydraulic connection with the leakage branch to filter the hydraulic liquid volume delivered through the additional pump.

A filter unit provides filtering of the volume of hydraulic liquid provided through the additional pump for removal of oil pollutions, such as wear particles, and increased reliability of the system operation.

According to another embodiment of the present invention, the electro-hydrostatic actuation system further comprises a cooling unit having a hydraulic connection with the leakage branch to cool down or heat up the hydraulic liquid volume delivered through the additional pump.

A cooling unit in the meaning of the present invention can be added to the actuation system in order to ensure maintenance of the hydraulic liquid. In particular, a cooling unit according to an embodiment of the present invention provides either heating or cooling capabilities specifically directed to the adjustment of the temperature of the volume of hydraulic liquid provided through the additional pump. Heat loss generated by the actuation system is removed near its origin and ensure the actuators are kept thermally stable.

According to a further embodiment of the present invention, the additional valve arranged in the flushing branch of the electro-hydrostatic actuation system is a pressure-reducing valve.

In the meaning of the present invention, a pressure reducing valve which, if needed, is used to regulate the housing pressure of the main pump in the actuation system to a constant low value, independently of the resulting external leakage and independently of low-pressure level.

According to a further embodiment of the present invention the electric motor in the electro-hydrostatic actuation system has a variable speed, e.g. is a servo-motor, and the main pump has a constant volume, e.g. static, or the electric motor has a constant speed, e.g. constant-motor, and the main pump is a variable displacement pump, or the electric motor has a variable speed, e.g. is a servo-motor, and the main pump is a variable displacement pump.

In the meaning of the present invention an electric motor or electric engine drives the hydrostatic pump to determine a conversion of electrical power into hydraulic power, in order to drive different types of actuators, particularly hydraulic actuators, such as, e.g., cylinders.

In particular, a variable-speed electric motor, variable-speed drive or adjustable-speed drive is advantageous when a control of the hydraulic flow is required for increased energy saving and operational efficiency of the actuation system. A variable displacement pump typically converts mechanical energy into hydraulic energy, but many exists whose working function can be reversed, so to convert hydraulic energy into mechanical energy. Several types of variable displacement pump exist and can be employed according to embodiments of the present invention; nevertheless their common principle is that the displacement or the amount of liquid that is pumped per revolution of the shaft of the pump can be controllably changed while the pump is running.

A further aim of the present invention is the provision of a method for extending the operational range of an electro-hydrostatic actuation system, in particular using any of the embodiments of the actuation system described so far, or combinations thereof.

In the meaning of the present invention, a method for increasing the operational range of an electro-hydrostatic actuation system according to the described embodiments provides that the additional pump controls the pressure in the low-pressure section of the housing of the main pump.

The additional pump, arranged on the leakage branch of the actuation system according to the present invention, acts on the sealing means in the housing of the main pump to lower the lower pressure of operation and therefore allow the actuation system to be operated at higher speeds.

In the meaning of the present invention, a method for increasing the operational range of an electro-hydrostatic actuation system according to the described embodiments provides that the pressure difference between the pressure in the low-pressure circuit and the low-pressure section of the housing of the main pump does not fall below a predefined value.

In the meaning of the present invention, a method for increasing the operational range of an electro-hydrostatic actuation system according to the described embodiments provides that the predefined value of the pressure difference between the pressure in the low-pressure circuit and the low-pressure section of the housing of the main pump is in a range from 0.2 bar to 20 bar, and preferably in a range from 0.5 bar to 10 bar, and more preferably in a range from 1 bar to 5 bar.

The ability to maintain the pressure difference between the pressure in the low-pressure circuit and the low-pressure section of the housing of the main pump within the given range of values and checking that said pressure difference does not fall below a predefined value ensures that the system is kept in efficient working conditions and can adapt to the requirements of its components and applications saving energy and keeping up performance.

In the meaning of the present invention, a method for increasing the operational range of an electro-hydrostatic actuation system according to the described embodiments provides that the resulting pressure in the low-pressure section of the housing of the main pump is defined by the difference between a flow of the additional pump and a leakage flow deriving from the gap sealings separating the high-pressure section from the low-pressure section of the housing of the main pump and a hydraulic resistance in the flushing branch.

In this embodiment of the present invention, the leakage flow generated by the additional pump in the leakage branch plays a role together with the flushing branch of previous embodiments. In this occurrence, the final effects can be better tailored to different applications and structural requirements, according to the given architecture of an existing system or to the specific actuator being driven.

The use of the electro-hydrostatic actuation system according to the embodiments presented above for driving self-sufficient or self-contained axes is also comprised within the scopes of the present invention.

The use of the electro-hydrostatic actuation system for driving an actuator, e.g. a double-rod or synchronous cylinder, a pivoting drive, a hydraulic rotary drive and/or a differential cylinder is also comprised within the scopes of the present invention.

Further aspects of the present invention are provided in the following detailed description that features possible embodiments of the invention in the guise of exemplary embodiments and a simulation. It is worth noticing that any modifications or additions that can be derived directly from the person skilled in the art are covered by these examples. In particular, it is noted that such examples or preferred embodiments are not intended, nor formulated, to restrict the scope of protection of the present application.

The accompanying figures schematics and graphs herein incorporated, constitute part of the specification and illustrate several aspects of the present invention; taken together with the description, the figures and graphs help explaining certain principles of the invention.

Figure 1A:
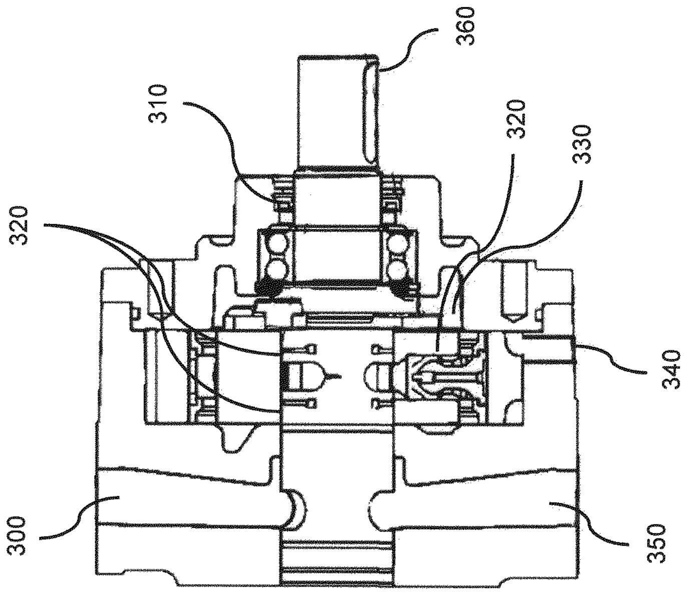

FIG. 1*a*: Cross-sectional view of a pump with external leakage oil connection, suggesting the pressure conditions within the housing.

FIG. 1*b*: Example of speed-dependent pressure limitation of rotary shaft seal—housing pressure derating characteristic.

Figure 2:
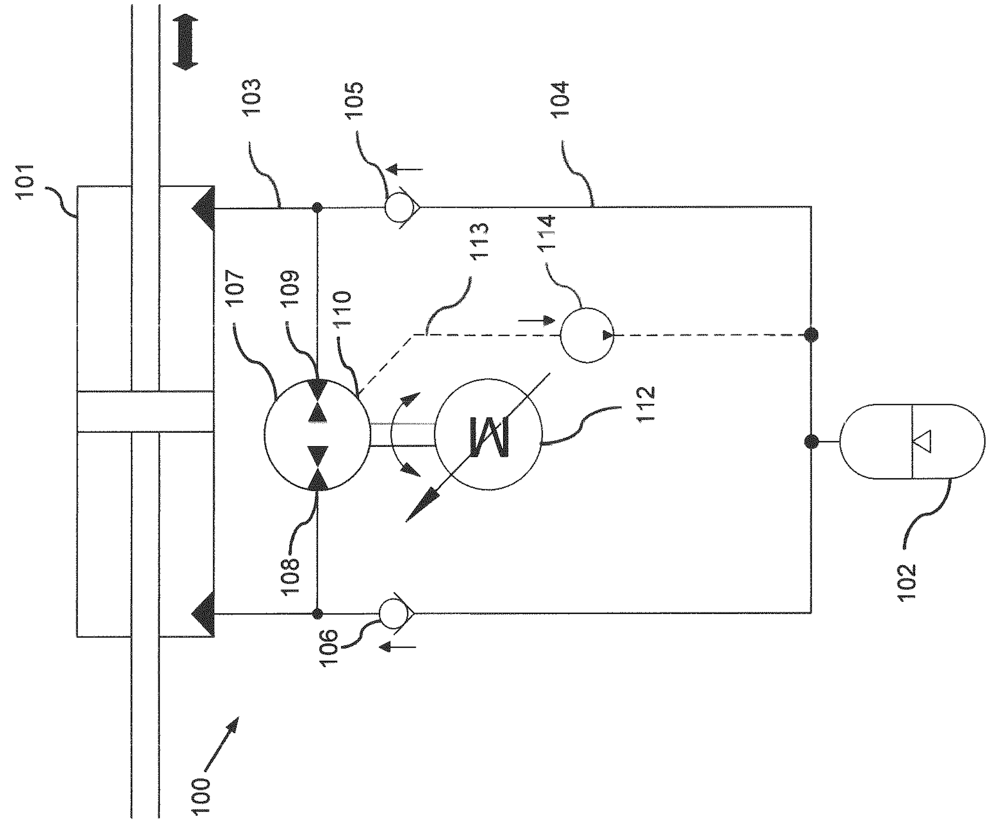

FIG. 2: Electro-hydrostatic actuation system for driving a hydraulic actuator, e.g. a hydraulic cylinder, comprising a leakage branch wherein an additional pump is arranged.

Figure 3:
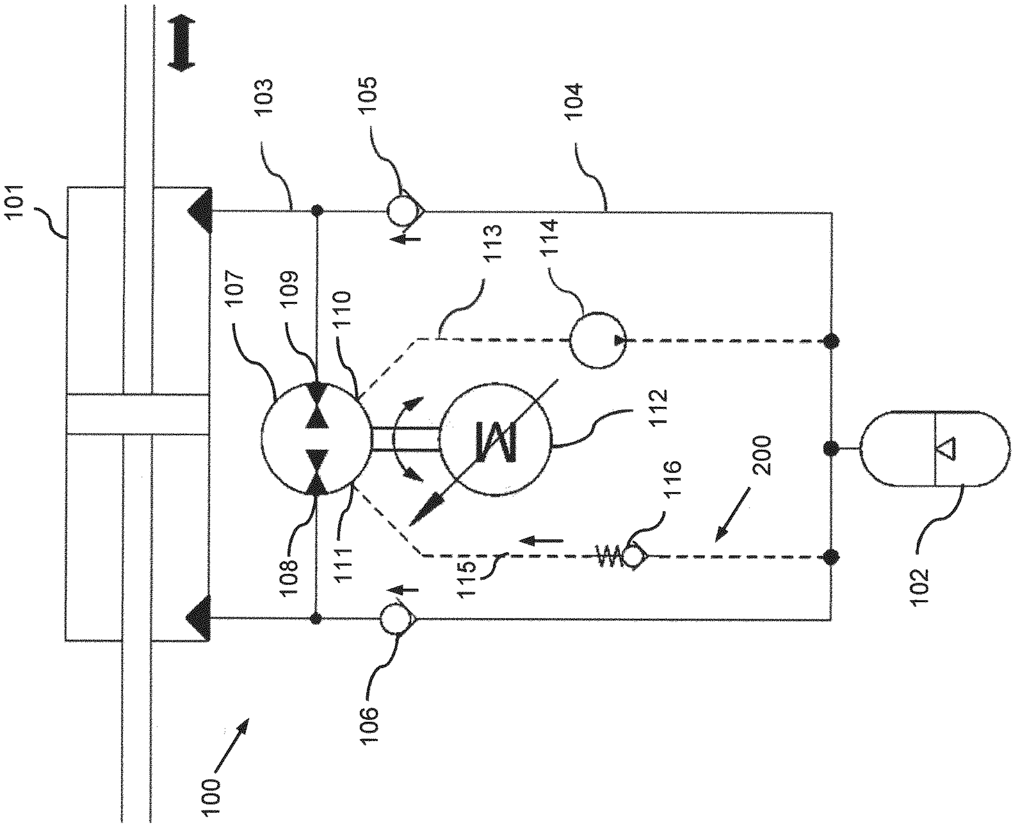

FIG. 3: Electro-hydrostatic actuation system for driving a hydraulic actuator, e.g. a hydraulic cylinder, of FIG. 2, further comprising a flushing branch connecting a flushing inlet of the low-pressure section of the main pump to the low pressure circuit and having a hydraulic connection with the leakage branch.

Figure 4:
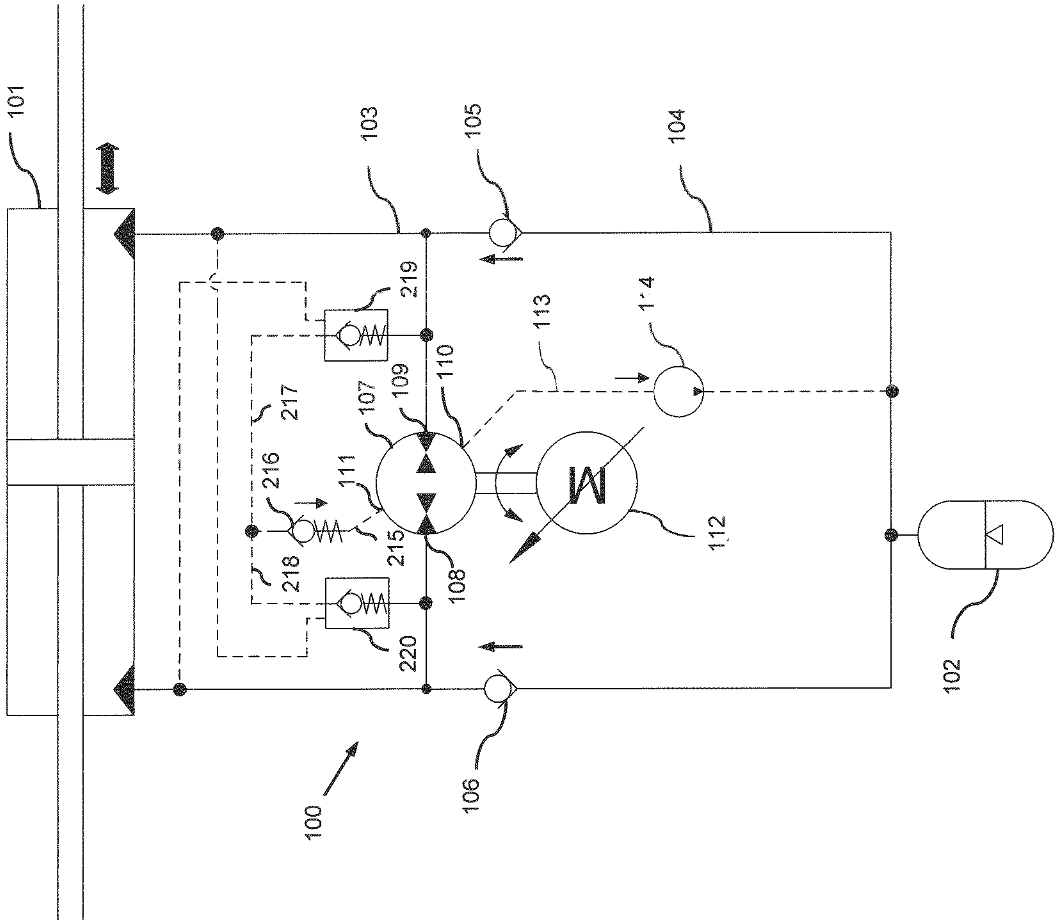

FIG. 4: Electro-hydrostatic actuation system for driving a hydraulic actuator, e.g. a hydraulic cylinder, of FIG. 2, further comprising a flushing branch connecting a flushing inlet of the low-pressure section of the main pump to the high pressure circuit and having a hydraulic connection with the leakage branch.

Figure 5:
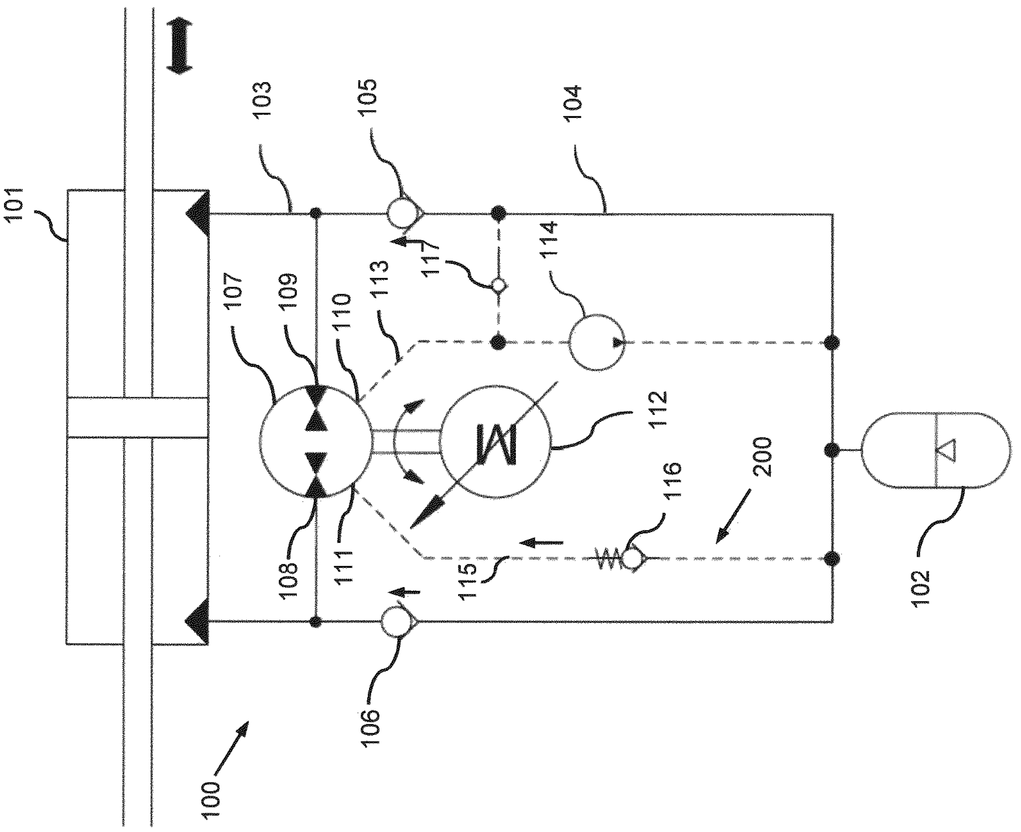

FIG. 5: Electro-hydrostatic actuation system for driving a hydraulic actuator, e.g. a hydraulic cylinder, of FIG. 2, further comprising a flushing branch connecting a flushing inlet of the low-pressure section of the main pump to the low pressure circuit and having a hydraulic connection with the leakage branch, further comprising an additional valve before the additional pump.

Figure 6:
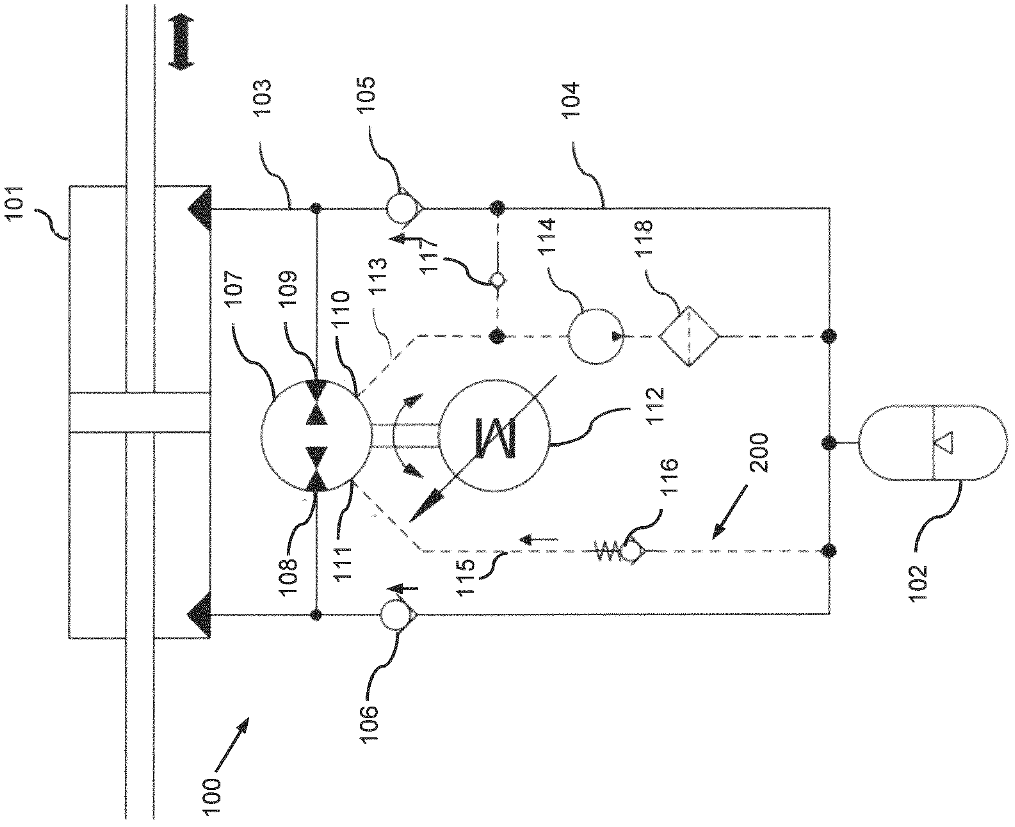

FIG. 6: Electro-hydrostatic actuation system for driving a hydraulic actuator, e.g. a hydraulic cylinder, of FIG. 2, further comprising a flushing branch according to FIG. 4, further comprising a filter unit.

Figure 7:
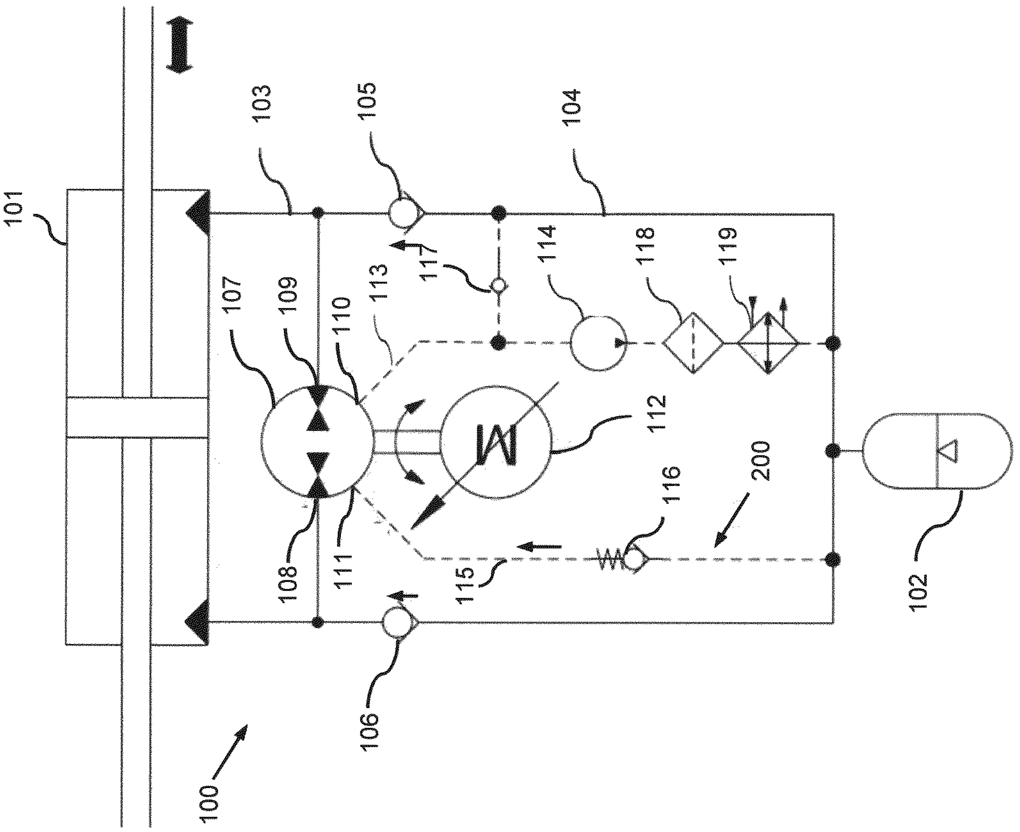

FIG. 7: Electro-hydrostatic actuation system for driving a hydraulic actuator, e.g. a hydraulic cylinder, of FIG. 2, further comprising a flushing branch according to FIG. 5, further comprising a cooling unit.

Figure 8:
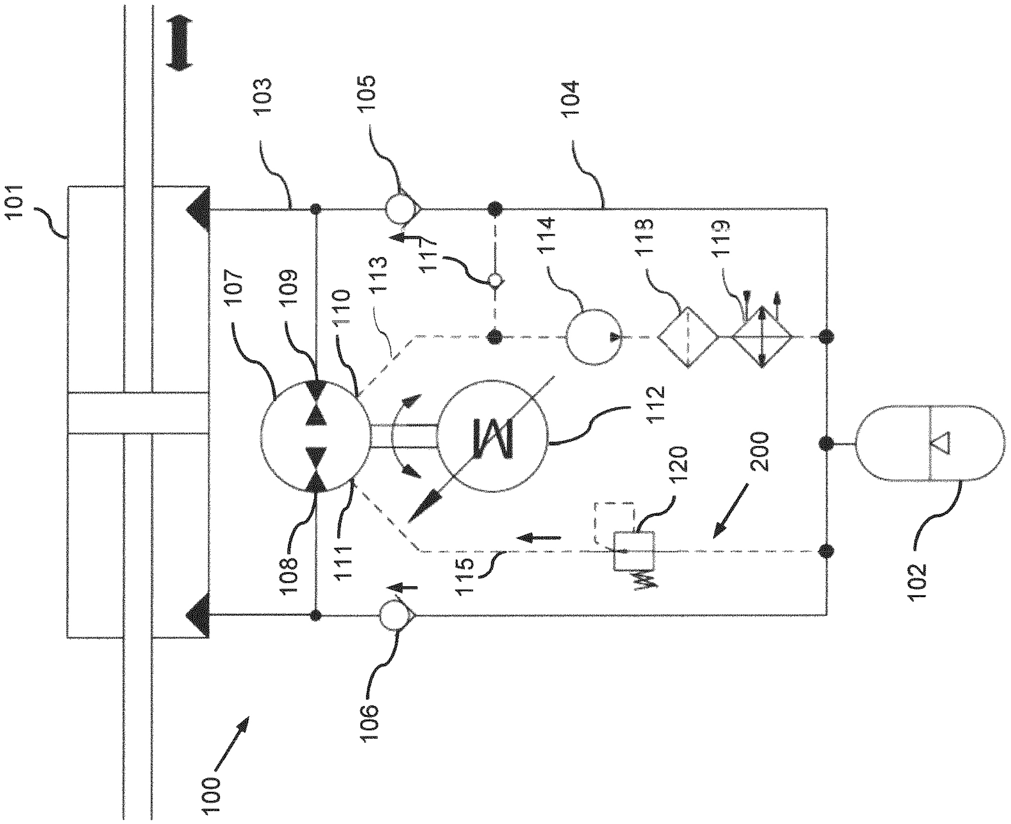

FIG. 8: Electro-hydrostatic actuation system for driving a hydraulic actuator, e.g. a hydraulic cylinder, of FIG. 2, further comprising a flushing branch according to FIG. 6, wherein the valve on the flushing branch is a pressure-reducing valve.

Figure 9:
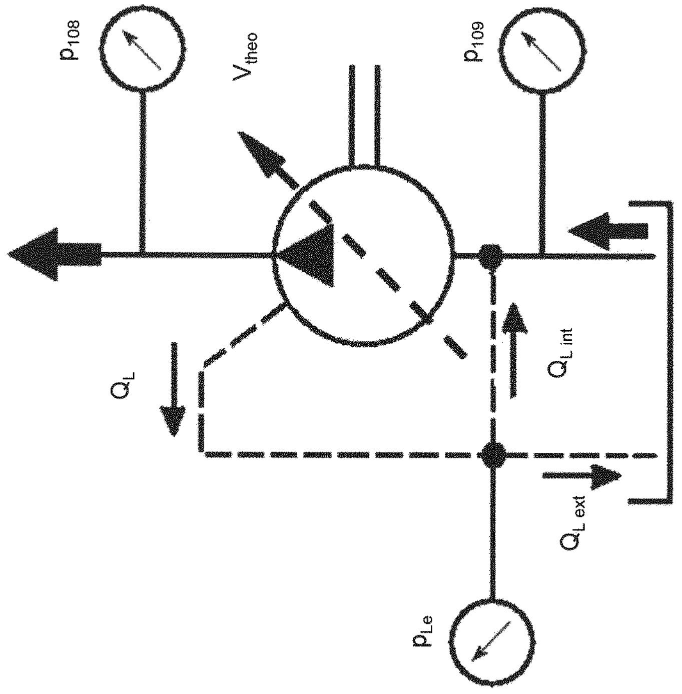

FIG. 9: Schematic representing the volume flows in pumps with external leakage oil connection (QLext—external leak oil, QLint—internal leak oil)

Figure 10:
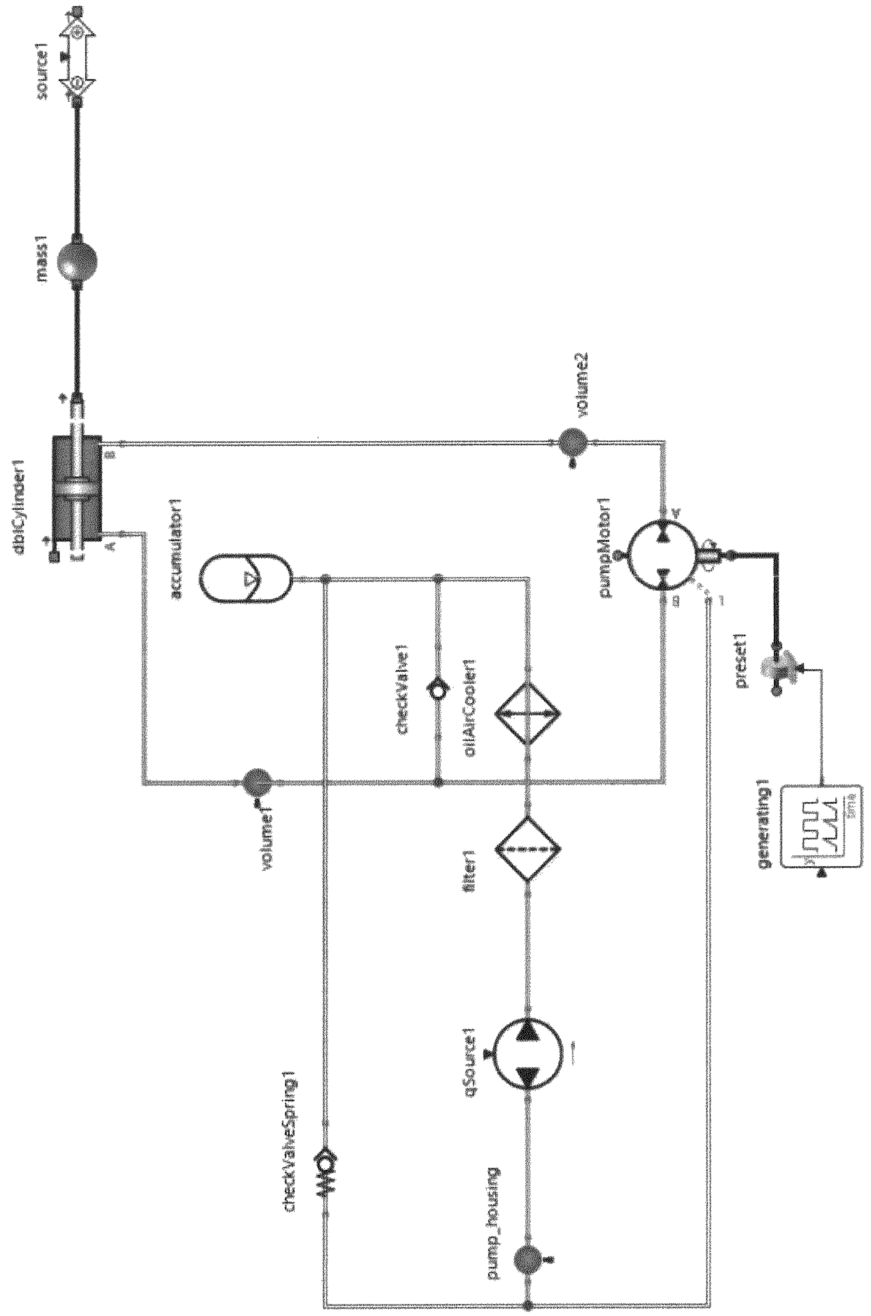

FIG. 10: Simulated circuit to test the system behaviour according to the arrangement of FIG. 7 and as described in Example 1.

Figure 11:
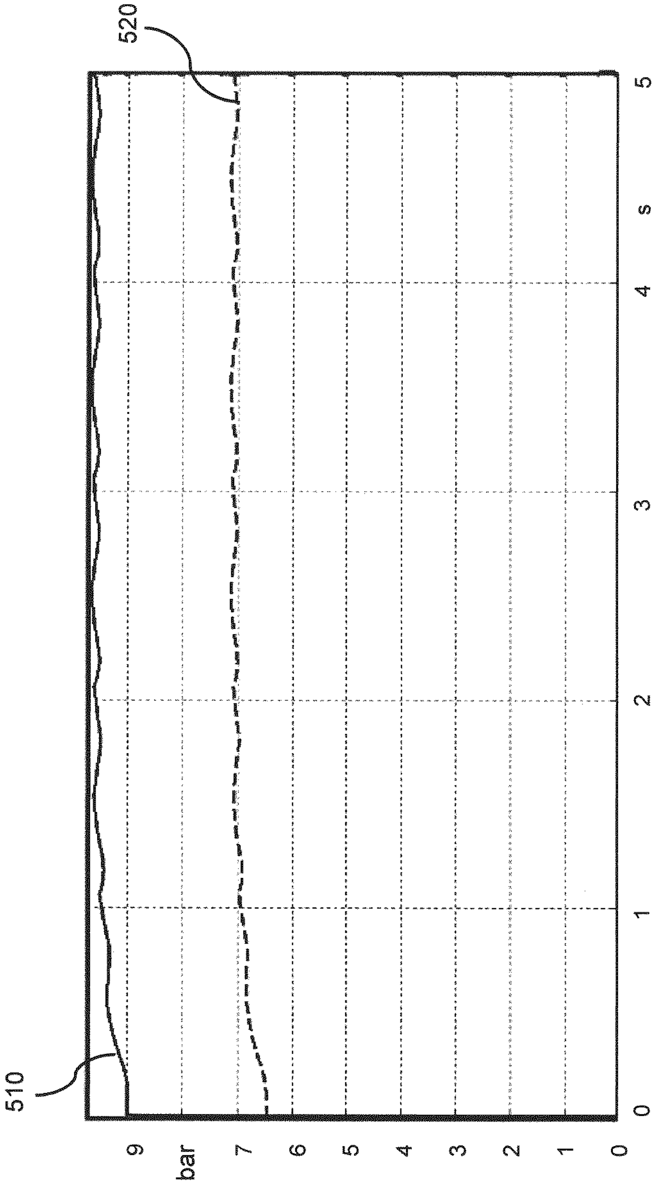

FIG. 11: Results of the simulation according to the circuit in FIG. 10 for the lower pressure in the accumulator and in the housing of the main pump with a hydraulic liquid flow from the additional pump of 7 l/min and high actuator forces. The pressure reduction is of ca. 2.8 bar.

Figure 12:
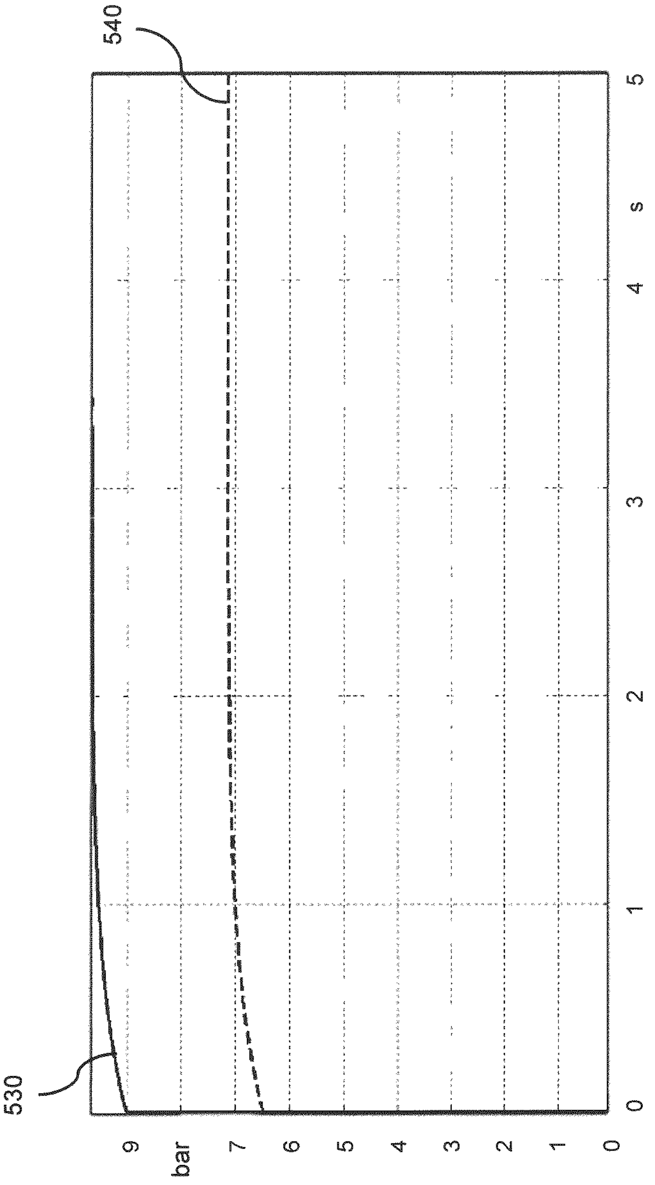

FIG. 12: Results of the simulation according to the circuit in FIG. 10 for the lower pressure in the accumulator and in the housing of the main pump with a hydraulic liquid flow from the additional pump of 7 l/min and low actuator forces. The pressure reduction is of ca. 2.7 bar.

FIG. 1*a* shows a cross-sectional view of the internal structure of a pump with external leakage oil connection, suggesting the pressure conditions within the housing. The pump comprises a first outlet 300; a second outlet 350, in hydraulic connection with, and defining, a high-pressure circuit in an electro-hydrostatic actuation system or hydraulic circuit such as 100 as shown in FIGS. 2-8; gap sealings/seals 320, on which an additional pump may act for regulating the low pressure in the low-pressure section of the main pump housing; a shaft seal 310 limiting the permissible pump housing pressure; and external leakage outlet 340 in hydraulic connection with a leakage branch. In the low-pressure section of the pump housing 330 the pressure values equal the pressure of the hydraulic liquid leakage. The pump comprises a drive shaft 360 for connection with the electric motor.

FIG. 1*b* shows the derating curve for an electro-hydrostatic actuation system, wherein the pressure in the housing of the main pump is plotted against the speed at which the system is operated. In particular, as discussed above, the housing pressure at speeds higher than 1800 r/min decreases at increasing speeds. In fact, this means that the operation of an electro-hydrostatic actuation system at the maximum allowable pressure in the low-pressure section of the housing of the main pump in the system is limited by the process dynamics. Nevertheless, the shaft seal of the pump has a pressure limitation that, for example, in the case of a rotary shaft seal, allows a maximum pressure of 10 bar in the low-pressure section of the main pump, which decreases, e.g. down to 4 bar at 4500 RPM, when the system is run at higher speeds, wherein higher speeds is intended e.g. as speeds starting from 1800 RPM. Therefore, in the systems found in the state of the art, the pressure in the low-pressure section of the main pump, when the motor-pump unit is operated up to 4500 RPM, is limited e.g. to a maximum of 4 bar, and the rotary shaft seal is pressurized at said 4 bar.

In a self-contained axis system, a lower pressure (such as e.g. the above-mentioned 4 bar) in the low-pressure section of the main pump requires a larger low-pressure hydro-accumulator, compared to a system with a higher pressure (e.g. 10 bar) in the low-pressure section of the main pump. Owing to the need for a larger low-pressure hydro-accumulator resulting from the lower low pressure in the low-pressure section of the main pump, such systems are less compact.

Furthermore, owing to the lower pressure in the low-pressure section of the main pump, the actuator of a self-contained axis is less clamped. As a result, the elastic modulus of the axis is smaller, leading to a smaller natural frequency, and consequently to a far less effective control of the axis.

FIG. 2 shows an electro-hydrostatic actuation system or hydraulic circuit 100 according to one embodiment of the present invention. In the figure, the actuation system 100 is represented in connection with a hydraulic actuator, e.g. a hydraulic cylinder 101. The actuation system or hydraulic circuit 100 comprises a source or accumulator 102, an electric motor 112 driving the main pump 107. The main pump 107, comprising the outlet 108 and the outlet 109 to provide hydraulic flow of the hydraulic liquid in the high-pressure circuit 103, is provided with a leakage outlet 110 in hydraulic connection with the low-pressure circuit 104 through the leakage branch 113. An additional pump 114 is arranged on the leakage branch 113 in order to promote the leakage flow through the low-pressure circuit 104. A first valve 105 and a second valve 106 are arranged in the low-pressure circuit 104 in order to provide parametric control of the hydraulic flow in the actuation system or hydraulic circuit 100.

FIG. 3 shows an electro-hydrostatic actuation system or hydraulic circuit 100 according to another embodiment of the present invention. In the figure, the actuation system 100 is represented in connection with a hydraulic actuator, e.g. a hydraulic cylinder 101. The actuation system or hydraulic circuit 100 comprises a source or accumulator 102, an electric motor 112 driving the main pump 107. The main pump 107, comprising the outlet 108 and the outlet 109 to provide hydraulic flow of the hydraulic liquid in the high-pressure circuit 103, is provided with a leakage outlet 110 in hydraulic connection with the low-pressure circuit 104 through the leakage branch 113. An additional pump 114 is arranged on the leakage branch 113 in order to promote the leakage flow through the low-pressure circuit 104. A first valve 105 and a second valve 106 are arranged in the low-pressure circuit 104 in order to provide parametric control of the hydraulic flow in the actuation system or hydraulic circuit 100. In FIG. 3 an additional branch or flushing circuit 200 is shown, comprising a flushing branch 115 connecting the flushing inlet 111 arranged in the low-pressure section of the main pump 107 to the low-pressure circuit 104. A valve 116 is arranged on the flushing branch in order to exert parametric control of the hydraulic flow throughout the circuit.

FIG. 4 shows an electro-hydrostatic actuation system or hydraulic circuit 100 according to another embodiment of the present invention. In the figure, the actuation system 100 is represented in connection with a hydraulic actuator, e.g. a hydraulic cylinder 101. The actuation system or hydraulic circuit 100 comprises a source or accumulator 102, an electric motor 112 driving the main pump 107. The main pump 107, comprising the outlet 108 and the outlet 109 to provide hydraulic flow of the hydraulic liquid in the high pressure circuit 103, is provided with a leakage outlet 110 in hydraulic connection with the low-pressure circuit 104 through the leakage branch 113. An additional pump 114 is arranged on the leakage branch 113 in order to promote the leakage flow through the low-pressure circuit 104. A first valve 105 and a second valve 106 are arranged in the low-pressure circuit 104 in order to provide parametric control of the hydraulic flow in the actuation system or hydraulic circuit 100. In FIG. 4 an additional branch or flushing circuit is shown, comprising a flushing branch 215 connecting the flushing inlet 111 arranged in the low-pressure section of the main pump 107 to the high-pressure circuit 103 through the control branches 217 and 218. A valve 216 is arranged on the flushing branch in order to exert parametric control of the hydraulic flow throughout the circuit. The control branches 217 and 218 comprise a first valve 219 and a second valve 220 and are arranged in order to establish and maintain a safe hydraulic connection between the flushing branch 215 and the high-pressure circuit 103.

FIG. 5 shows an electro-hydrostatic actuation system or hydraulic circuit 100 according to yet another embodiment of the present invention, which comprises the arrangement shown first in FIG. 3. Additionally to the embodiment of FIG. 3, the embodiment of FIG. 5 further comprises an additional valve 117, which is arranged before the additional pump 114 and has a hydraulic connection with the low-pressure circuit 104.

FIG. 6 shows an electro-hydrostatic actuation system or hydraulic circuit 100 according to yet another embodiment of the present invention, which comprises the arrangement shown first in FIG. 5. Additionally to the embodiment of FIG. 5, the embodiment of FIG. 6 further comprises a filter unit 118 having a hydraulic connection with the leakage branch 113 to filter the hydraulic liquid volume of delivered through the additional pump 114.

FIG. 7 shows an electro-hydrostatic actuation system or hydraulic circuit 100 according to yet another embodiment of the present invention, which comprises the arrangement shown first in FIG. 6. Additionally to the embodiment of FIG. 6, the embodiment of FIG. 7 further comprises a cooling unit 119 having a hydraulic connection with the leakage branch to cool down or heat up the hydraulic liquid volume delivered through the additional pump 114; this ensures the thermal stability of the system through providing temperature regulation of the hydraulic liquid flow.

FIG. 8 shows an electro-hydrostatic actuation system or hydraulic circuit 100 according to yet another embodiment of the present invention, which comprises the arrangement shown first in FIG. 7. Alternatively to the embodiment of FIG. 7, the embodiment of FIG. 8 shows a pressure-reducing valve 120 arranged in the flushing branch 115. The pressure-reducing valve 120 is used to regulate the housing pressure of the main pump in the actuation system to a constant low value, independently of the resulting external leakage and independently of low-pressure level/value.

FIG. 9 illustrates the hydraulic liquid volume flows in pumps with external leakage oil connection using a schematic. In the schematic $V_{theo}$ indicates the theoretical displacement in a variable displacement pump; the pressure values $p_{108}$ and $p_{109}$ are associated with the high-pressure outlets of the main pump, defining and connected with the high-pressure circuit, a third pressure value $p_{Le}$ represents the pressure at the leakage outlet of the main pump where from a hydraulic leakage flow is indicated as $Q_L$, and which is separated as $Q_{Lext}$ or external leakage of hydraulic liquid and $Q_{Lint}$ or internal leakage of hydraulic liquid. The solid arrows indicate the direction of the flow of the hydraulic liquid.

FIG. 10 shows the simulation circuit utilized to test the robustness of a preferred embodiment of the present invention, as described in FIG. 7. Example 1 reports the conditions of the simulation and the results obtained under two different setups.

FIG. 11 consists of a graphical representation showing the results of the simulation executed according to the simulation circuit in FIG. 10, based on the embodiment as described in FIG. 7, for the lower pressure in the accumulator and in the housing of the main pump with a hydraulic liquid flow from the additional pump of 7 l/min and high actuator forces. The pressure reduction is of ca. 2.8 bar.

FIG. 12 consists of a graphical representation showing the results of the simulation executed according to the simulation circuit in FIG. 10, based on the embodiment as described in FIG. 7, for the lower pressure in the accumulator and in the housing of the main pump with a hydraulic liquid flow from the additional pump of 7 l/min and low actuator forces. The pressure reduction is of ca. 2.7 bar.

EXAMPLE 1—SIMULATION

A calculation of the system behaviour according to the embodiment described in FIG. 7 has shown robustness of this solution against load variations and resulting different leaks. The results are shown in FIGS. 10, 11, 12.

The simulation has been carried out using the software Simulation X and the following boundaries conditions:

Variable speed of the electro-hydraulic actuation system with pump size 19 $cm^3$ rotates with sine 2 Hz+/−4500 rpm;

External leakage modelled according to Moog measurements (about 2.5 l/min at 350 bar);

Variable speed of the electro-hydraulic actuation system goes through all 4 quadrants;

Dimensions of synchronous cylinder: piston diameter 110 mm, bar diameter 50 mm each;

Cylinder stroke: 50 mm;

Preload in the system: approx. 8 bar;

Hydraulic storage volume: 0.5 l;

Cooling/filter pump constant with 7 l/min;

Opening pressure check valve: 1 bar.

Simulation no. 1: load on the cylinder with sine wave 1 Hz+/−90 kN=>pressure on HP (high pressure) side adjusts to approx. 130 bar Simulation No. 2: load on the cylinder with sine wave 1 Hz+/−0.09 kN=>Pressure on HP side adjusts to approx. 10 bar Both simulations provided nearly identical results for the resulting low pressures and the reduced housing pressure.

List of elements

| | |
|---|---|
| 100 | actuation system or hydraulic circuit |
| 101 | hydraulic actuator, e.g. a hydraulic cylinder |
| 102 | source or accumulator |
| 103 | high-pressure circuit |
| 104 | low-pressure circuit |
| 105 | first valve |
| 106 | second valve |
| 107 | main pump |
| 108 | first outlet |
| 109 | second outlet |
| 110 | leakage outlet |
| 111 | flushing inlet |
| 112 | electric motor |
| 113 | leakage branch |
| 114 | additional pump |
| 115 | flushing branch |
| 116 | valve |
| 117 | additional valve |
| 118 | filter unit |
| 119 | cooling unit |
| 120 | pressure-reducing valve |
| 200 | flushing circuit |
| 215 | flushing branch |
| 216 | valve |
| 217 | control branch |
| 218 | control branch |
| 219 | first valve |
| 220 | second valve |
| 300 | first outlet |
| 310 | shaft seal |
| 320 | gap sealing/seal |
| 330 | low-pressure section of the pump housing |
| 340 | leakage outlet |
| 350 | second outlet |
| 360 | drive shaft to the electric motor |
| 510 | low-pressure values in low-pressure circuit |
| 520 | lower low-pressure values in pump housing |
| 530 | low-pressure values in low-pressure circuit |
| 540 | lower low-pressure values in pump housing |

The invention claimed is:

1. An electro-hydrostatic actuation system for driving a hydraulic actuator, comprising:

a container for providing hydraulic liquid;

a high pressure circuit to direct the hydraulic liquid to a hydraulic actuator;

a low pressure circuit having multiple branches;

a main pump for the hydraulic liquid arranged in the high pressure circuit;

the main pump comprising a housing having a high pressure section and a low pressure section, separated by sealing gaps, wherein the high pressure section comprises a first outlet and a second outlet to provide the hydraulic liquid flow in the high pressure circuit, and wherein the low pressure section comprises a leakage outlet;

an electric motor driving the main pump;

a leakage branch connecting the leakage outlet of the low pressure section of the housing of the main pump to the low pressure circuit, wherein an additional pump is arranged;

a flushing branch connecting a flushing inlet of the low pressure section of the housing of the main pump to the low pressure circuit, and having a hydraulic connection with the leakage branch, wherein the flushing branch comprises a first end fluidly connected to the flushing inlet, a second end, and a unidirectional check valve arranged between the first end and the second end; and an additional branch including a third end directly connected to the leakage branch at a point between and spaced apart from the main pump and the additional pump, and a fourth end directly connected to the low pressure circuit, wherein an additional valve is arranged on the additional branch between the third end and the fourth end.

2. An electro-hydrostatic actuation system according to claim 1, further comprising a first valve and a second valve separating the high pressure circuit from the low pressure circuit.

3. The electro-hydrostatic actuation system as recited in claim 2, wherein the fourth end is directly connected to the low pressure circuit at a position upstream of the first valve and the second valve.

4. The electro-hydrostatic actuation system as recited in claim 2, wherein the unidirectional check valve is a pressure reducing valve.

5. An electro-hydrostatic actuation system according to claim 1, wherein the additional pump has a delivery volume larger than a leakage volume of the main pump occurring in the low pressure section of the housing of the main pump.

6. An electro-hydrostatic actuation system according to claim 1, further comprising a filter unit having a hydraulic connection with the leakage branch to filter a hydraulic liquid volume delivered through the additional pump.

7. An electro-hydrostatic actuation system according to claim 1, further comprising a cooling unit having a hydraulic connection with the leakage branch to cool down or heat up a hydraulic liquid volume delivered through the additional pump.

8. An electro-hydrostatic actuation system according to claim 1, wherein the additional pump is operatively configured to control a pressure in the low pressure section of the housing of the main pump.

9. An electro-hydrostatic actuation system according to claim 1, wherein an operative pressure difference between a pressure in the low pressure circuit and the low pressure section of the housing of the main pump does not fall below a predefined value.

10. An electro-hydrostatic actuation system according to claim 9, wherein the predefined value of the pressure difference between the pressure in the low pressure circuit and the low pressure section of the housing of the main pump is in a range from 0.2 to 20 bar.

11. An electro-hydrostatic actuation system according to claim 10, wherein the predefined value of the pressure difference between the pressure in the low pressure circuit and the low pressure section of the housing of the main pump is in a range from 0.5 to 10 bar.

12. An electro-hydrostatic actuation system according to claim 11, wherein the predefined value of the pressure difference between the pressure in the low pressure circuit and the low pressure section of the housing of the main pump is in a range from 1 to 5 bar.

13. An electro-hydrostatic actuation system according to claim 1, wherein an operative pressure in the low pressure section of the housing of the main pump is defined by a difference between a flow of the additional pump and a leakage flow deriving from the sealing gaps separating the high pressure section from the low pressure section of the housing of the main pump and a hydraulic resistance in the flushing branch.

14. An electro-hydrostatic actuation system according to claim 1, wherein the hydraulic actuator is selected from a group consisting of a hydraulic cylinder, a double-rod or synchronous cylinder, a pivoting drive, a hydraulic rotary drive and/or a differential cylinder.

15. An electro-hydrostatic actuation system for driving a hydraulic actuator, comprising:

a container for providing hydraulic liquid;

a high pressure circuit to direct the hydraulic liquid to a hydraulic actuator;

a low pressure circuit having multiple branches;

a main pump for the hydraulic liquid arranged in the high pressure circuit;

the main pump comprising a housing having a high pressure section and a low pressure section, separated by sealing gaps, wherein the high pressure section comprises a first outlet and a second outlet to provide the hydraulic liquid flow in the high pressure circuit, and wherein the low pressure section comprises a leakage outlet;

an electric motor driving the main pump;

a leakage branch connecting the leakage outlet of the low pressure section of the housing of the main pump to the low pressure circuit, wherein an additional pump is arranged; and a flushing branch connecting a flushing inlet of the low pressure section of the housing of the main pump to the high pressure circuit, and having a hydraulic connection with the leakage branch, wherein a pilot operated check valve is arranged in the flushing branch.

16. The electro-hydrostatic actuation system according to claim 15, wherein the hydraulic connection between the high pressure circuit with the leakage branch comprises additional pressure-controlled valves.

17. An electro-hydrostatic actuation system according to claim 16, wherein the additional pressure-controlled valves of the hydraulic connection between the high pressure circuit with the leakage branch comprise pressure-controlled unidirectional check valves.

18. An electro-hydrostatic actuation system for driving a hydraulic actuator, comprising:

a container for providing hydraulic liquid;

a high pressure circuit to direct the hydraulic liquid to a hydraulic actuator;

a low pressure circuit having multiple branches;

a first valve and a second valve separating the high pressure circuit from the low pressure circuit;

a main pump for the hydraulic liquid arranged in the high pressure circuit;

the main pump comprising a housing having a high pressure section and a low pressure section, separated by sealing gaps, wherein the high pressure section comprises a first outlet and a second outlet to provide the hydraulic liquid flow in the high pressure circuit, and wherein the low pressure section comprises a leakage outlet;

an electric motor driving the main pump;

a leakage branch connecting the leakage outlet of the low pressure section of the housing of the main pump to the low pressure circuit, wherein an additional pump is arranged;

a flushing branch connecting a flushing inlet of the low pressure section of the housing of the main pump to the high pressure circuit, and having a hydraulic connection with the leakage branch, wherein the flushing branch comprises a first end connected to the flushing inlet, a second end, and a third valve;

a first control branch including a third end connected to the second end and a fourth end connected to the high pressure circuit at a first position spaced apart from the first outlet and the second outlet, the first control branch comprising a fourth valve arranged between the third end and the fourth end; and a second control branch including a fifth end connected to the second end and a sixth end connected to the high pressure circuit at a second position spaced apart from the first outlet and the second outlet, the second control branch comprising a fifth valve arranged between the fifth end and the sixth end.

19. The electro-hydrostatic actuation system recited in claim 18, wherein at least one of the fourth valve and the fifth valve comprises at least three ports.

20. The electro-hydrostatic actuation system recited in claim 18, wherein the hydraulic liquid flows through the first control branch from the fourth end to the third end.

* * * * *